United States Patent [19]

Hamanishi

[11] Patent Number: 5,007,720
[45] Date of Patent: Apr. 16, 1991

[54] LENS SYSTEM ENABLING CLOSE DISTANCE PHOTOGRAPHING

[75] Inventor: Yoshinari Hamanishi, Wako, Japan
[73] Assignee: Nikon Corporation, Tokyo, Japan
[21] Appl. No.: 513,068
[22] Filed: Apr. 23, 1990

[30] Foreign Application Priority Data

Apr. 26, 1989 [JP] Japan ................ 1-106901

[51] Int. Cl.$^5$ ............... G02B 9/64; G02B 15/22
[52] U.S. Cl. .................... 350/463; 350/428
[58] Field of Search ............. 350/423, 427, 428, 463

[56] References Cited

U.S. PATENT DOCUMENTS

| | | | |
|---|---|---|---|
| 4,392,724 | 7/1983 | Hamanishi | 350/463 |
| 4,464,023 | 8/1984 | Kato et al. | 350/464 |
| 4,571,033 | 2/1986 | Kato et al. | 350/427 |
| 4,592,626 | 6/1986 | Fujii | 350/427 |
| 4,786,153 | 11/1988 | Ogata | 350/463 |

FOREIGN PATENT DOCUMENTS

| | | |
|---|---|---|
| 56-107210 | 8/1981 | Japan . |
| 58-34418 | 2/1983 | Japan . |
| 59-152414 | 8/1984 | Japan . |
| 59-228220 | 12/1984 | Japan . |
| 63-179308 | 7/1988 | Japan . |

*Primary Examiner*—Scott J. Sugarman
*Attorney, Agent, or Firm*—Shapiro and Shapiro

[57] ABSTRACT

A lens system enabling close distance photographing has an excellent image forming performance for a wide focussing range from infinite distance to equi-magnification distance while employing a relatively simple lens composition. The lens system has a basic composition including a 1st group of positive refractive power, a 2nd group of positive refractive power and a 3rd group of negative refractive power arranged in this order from the object side and in focussing from infinite distance to closest distance, the 1st group and the 2nd group move to the object side away from the 3rd group, which is fixed relative to the image plane, while expanding the space between the 1st and the 2nd groups, the 3rd negative group has a positive lens and a negative lens arranged in this order from the object side.

8 Claims, 2 Drawing Sheets

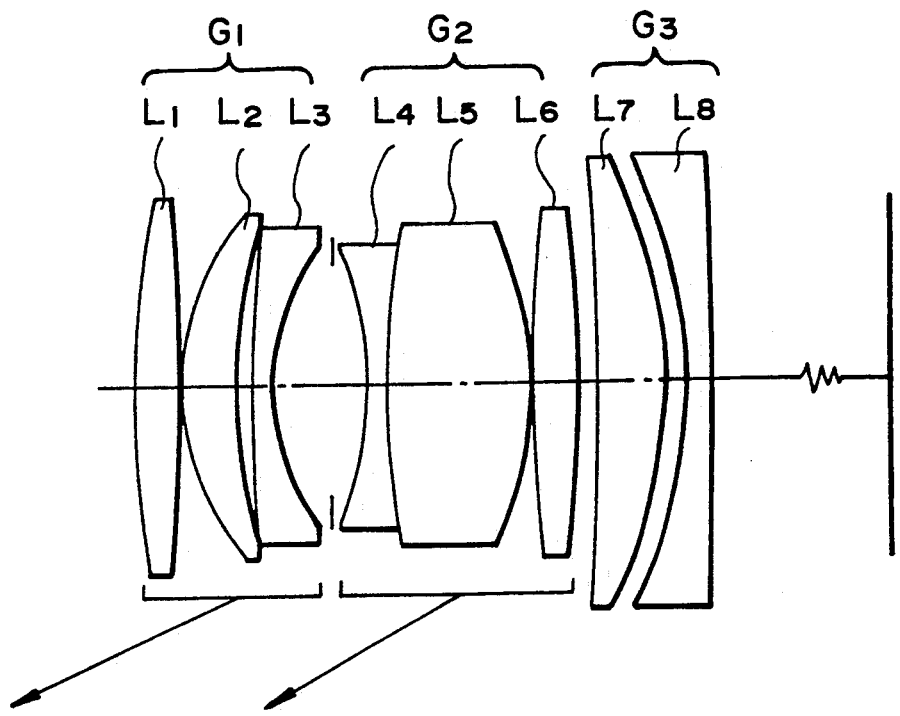
F I G. 2
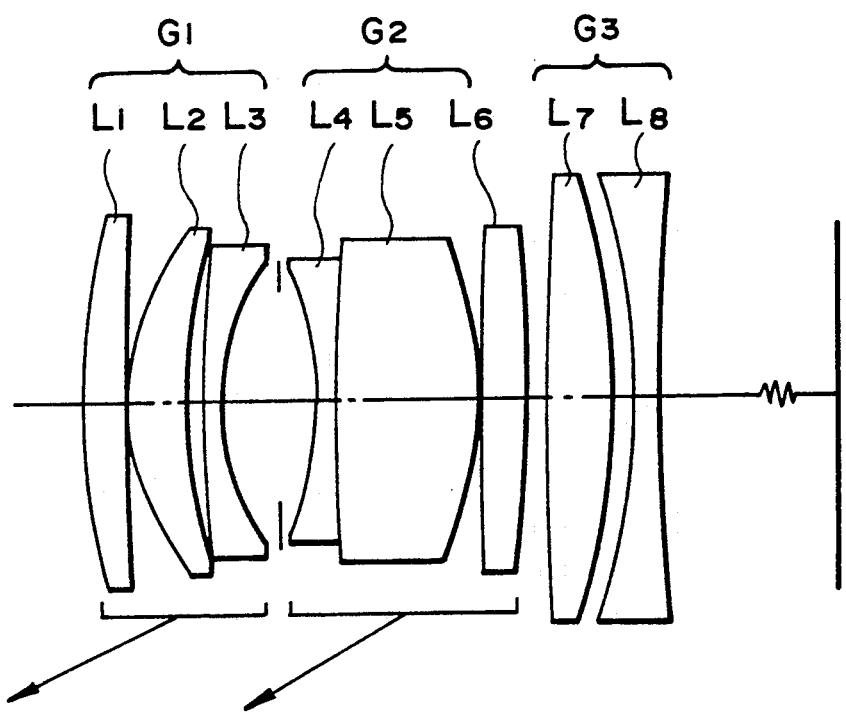
F I G. 3

LENS SYSTEM ENABLING CLOSE DISTANCE PHOTOGRAPHING

BACKGROUND OF THE INVENTION

1. Field of the Invention

The present invention relates to a photographing object lens enabling photographing at a close distance, particularly those employing the close distance correction system which enables to photography from infinity to equi-magnification.

2. Related Background Art

Various lens systems have been proposed which enable taking photographs at a distance from infinity to extremely close distance. Among such lens systems are (a) those which employ 3 group composition comprising positive 1st group, positive 2nd group and negative third group and focus the system by zooming out all three groups independently to the object side, as disclosed in Japanese Patent Application Laid-Open No. 59-228220, U.S. Pat. No. 4,786,153, No. 4,464,023; (b) (b) those which focus by zooming out the positive 1st group and the positive 2nd group while fixing the negative 3rd group, as disclosed in (1) U.S. Pat. No. 4,392,724, (2) Japanese Patent Application Laid-Open No. 58-34418, and (3) Japanese Patent Application Laid-Open No. 59-152414; and (c) those which focus by zooming out the positive 1st group and positive 2nd group as one set to the object side while fixing the 3rd negative group, as disclosed in Japanese Patent Application Laid-Open No. 63-179308.

These known lens systems are called micro-lens or macro-lens employing floating systems (hereinafter collectively called "micro-lens") and they enable taking photographs at a distance from infinity to the close distance where magnification is equi-magnification to about ½ scale. The aforesaid lens system (a) wherein all three lens groups move has an advantage in that it provides a large freedom for correction of varying aberration at the time of close distance photograph, as the number of movable lens groups is large, but on the other hand it poses a problem in that the focussing mechanism is complicated and the common difference of eccentricity of lens groups is rigid.

While the aforesaid lens system (c) has a simple focussing mechanism, the freedom of correction of aberration is too small and optical performance is not sufficient for focussing for a wide distance range as from infinity to equi-magnification.

In the aforesaid lens system (b), the system (1) disclosed in U.S. Pat. No. 4,392,724 enables to photography up to equi-magnification but the 3rd group has an extremely complicated lens composition. In system (2) disclosed in Japanese Patent Application Laid-Open No. 58-34418, the 3rd group has a relatively simple composition but since the magnification shared by the 3rd group is relatively high, the closest distance where photographing can still be done at a favorable state of aberration correction is not more than about ½ magnification. The system (3) disclosed in Japanese Patent Application Laid-Open No. 59-152414, has a drawback in that the magnification effected by the 3rd group is too low and consequently the maximum amount of zooming out of the 1st group must be made large and the lens diameter of the fixed 3rd group must be made large in order to secure peripheral light quantity in the case of extremely close distance photographing.

SUMMARY OF THE INVENTION

Now, therefore, an object of the present invention is to provide a lens system wherein the drawbacks of the aforesaid conventional lens systems are eliminated, an excellent image forming performance is maintained for a wide focussing range from infinite distance to equi-magnification distance while employing a relatively simple lens composition, the lens system can be made compact and the construction of the lens barrel is not required to be unusual.

The present invention employs a basic lens composition in which a 1st group of positive refractive power, a 2nd group of positive refractive power and a 3rd group of negative refractive power are arranged in this order from the object side, and in focussing from infinite distance to closest distance, the 1st group and the 2nd group move to the object side away from the 3rd group, which is fixed relative to the image plane, while expanding the space between the 1st and the 2nd groups, the 3rd negative group has a positive lens and a negative lens arranged in this order from the object side, and the following conditions are satisfied, wherein:

$f$: synthetic focal distance of the entire optical system in the infinite focussing state.
$f1$: focal distance of the aforesaid 1st group
$f2$: focal distance of the aforesaid 2nd group
$f3$: focal distance of the aforesaid 3rd group
$f12$: synthetic focal distance of the aforesaid 1st and 2nd groups.
$q$: shape factor of the positive lens in the aforesaid 3rd group, $$1.72 < f1/f < 2.0 \qquad (1)$$

$$1.5 < f1/f2 < 2.0 \qquad (2)$$

$$-5.5 < f3/f < -2.0 \qquad (3)$$

$$1.05 < f/f12 < 1.3 \qquad (4)$$

$$-1.22 < q < -0.65 \qquad (5)$$

(the shape factor $q$ is defined by the equation $$q = (rb + ra)/(rb - ra)$$

wherein the radius of curvature of the lens surface at the object side is $ra$ and the radius of curvature of the lens surface at the image side is $rb$).

According to the present invention as aforesaid, a lens system is provided in which an excellent image forming performance is maintained over an extremely wide focussing distance range from infinity to equi-magnification despite the lens composition being relatively simple and at the same time. The invention enables making the lens system compact and the construction of the lens barrel not unusual. Besides it enables reducing the amount of motion of the lens until the maximum magnification is obtained, and reducing the number of lenses in the lens system composition, assisting in the reduction of weight of the entire system.

Further object characteristics and effects of the present invention will be apparent in the following detailed description stated in reference to the attached drawings.

BRIEF DESCRIPTION OF THE DRAWINGS

FIG. 2 is a lens composition drawing of a 3rd embodiment of the present invention.

FIG. 3 is a lens composition drawing of a 4th embodiment of the present invention.

DESCRIPTION OF THE PREFERRED EMBODIMENTS

Figure 1:
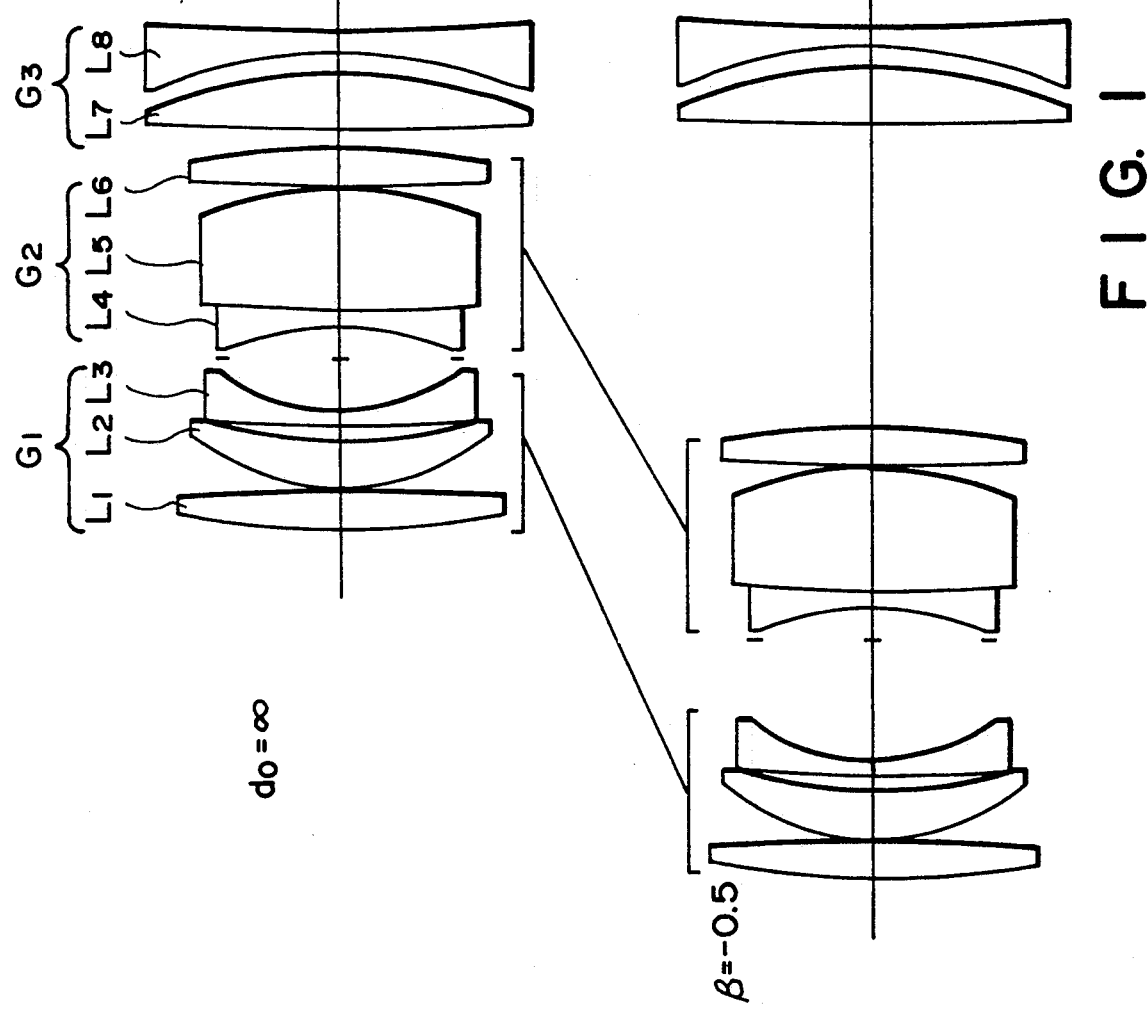
FIG. 1 is a lens composition drawing indicating the outline of the composition of a 1st embodiment and a 2nd embodiment of the present invention.

A micro-lens according to the present invention is a lens system which enables photographing at a distance from infinity to the close distance of equi-magnification ($\beta = -1$) and the lens composition thereof is as illustrated in FIGS. 1-3.

The system is so constructed that the 1st lens group G1 with positive refractive power, the 2nd lens group G2 with positive refractive power and the 3rd lens group with negative refractive power are arranged from the object side in the above order, the 1st lens group G1 being composed of the 1st lens L1 which is a positive lens, the 2nd lens L2 which is a positive meniscus lens with its convex surface facing the object and the 3rd lens L3 which is a negative meniscus lens with its convex surface facing the object. The 2nd lens group G2 with positive refractive power is composed of the 4th lens L4 which is a negative lens with concave surface facing the object, the 5th lens L5 which is a positive lens joined with the 4th lens L4 and the 6th lens L6 which is a positive lens convex at both sides. The 3rd lens group G3 with negative refractive power is composed of from the object side, the 7th lens L7 which is a positive lens with the surface of stronger curvature facing the image side and 8th lens L8 which is a negative lens with the surface of stronger curvature facing the object side. The aforesaid optical system is so arranged that in focussing from infinity to the closest distance, the 1st group G1 and the 2nd group G2 having positive refractive power move to the object side as viewed from the 3rd group G3, which is fixed relative to the image plane, while enlarging the space between each other. When the focal distance of the entire optical system at focussing for infinite distance is named f, the focal distance of the 1st group G1 is named f1, the focal distance of the 2nd group G2 is named f2, the focal distance of the 3rd group G3 is named f3, the synthetic focal distance of the 1st group G1 and the second group G2 is named f12 and the shape factor of the positive lens L7 among the 3rd lens group G3 is named q, the following conditions are established:

$$1.72 < f1/f < 2.0 \quad (1)$$

$$1.5 < f1/f2 < 2.0 \quad (2)$$

$$-5.5 < f3/f < -2.0 \quad (3)$$

$$1.05 < f/f12 < 1.3 \quad (4)$$

$$-1.22 < q < -0.65 \quad (5)$$

(here, the shape factor q is defined by $$q = (rb + ra)/(rb - ra),$$

wherein the radius of curvature of the lens surface at the object side is ra and the radius of curvature of the lens surface at the image side is rb).

Generally speaking, this sort of micro-lens enables photographing at a distance from infinity to the close distance of roughly equi-magnification and as the magnification rate increases, the amount of shift of the lens becomes extremely large. For example, the amount of zooming out X of the lens in the case of the total zoom-out system is expressed by $$X = -\beta f \quad 1$$

(here, $\beta$ is photographing magnification and f is the focal distance of the entire system) and at the distance of equi-magnification ($\beta = -1$), the amount of zooming out X is, $$X = f$$

which is extremely large.

On the other hand, in the case of a lens system of two group composition which is composed of a front group with positive refractive power (1/fa) and a rear group with the negative refractive power (1/fb) wherein the system is focussed by moving the front positive group to the object side by Xa while fixing the rear group, when synthetic magnification is $\beta$ ab, the relational expression is $$Xa = -\beta a.fa,$$

$$\beta ab = \beta a.\beta b,$$

$$fab = fa.\beta b$$

and therefore $$Xa = -\beta ab.fa^2/fab \quad 2$$

(here, $\beta a$ and $\beta b$ are the magnification shared by the respective group).

Therefore when synthetic magnification (photographing magnification) $\beta ab = -1$; the amount of zooming out Xa is, $$Xa = fa^2/fab.$$

Here, fb < 0, $\beta b$ < 1, therefore $$Xa/X = fa^2/fab^2 = 1/\beta b^2 < 1$$

and it is evident that $$Xa < X,$$

Therefore, by making the lens system a two group composition composed of a positive front group and a negative rear group, the amount of zoom-out required for focussing may be made smaller than in the case of a total zoom-out system.

With the system of the present invention which is composed of three lens groups, positive, positive and negative, if the 1st group G1 and the 2nd group G2 are regarded as a one unit front group, the system becomes in substance a two group lens system of a front positive lens group and a rear negative lens group as shown in formula 2 and the negative 3rd group G3 becomes the rear group. The difference between the lens composition of the present invention and the lens system of the aforesaid two group type is that in focussing, the space between the positive 1st group G1 and the second group G2 widens as they zoom out to the object side.

Now the refractive power 1/f12 of the front group which is composed of the 1st group G1 and the second group G2 changes as the lens zooms out and attenuates at the extremely close distance. That is, assuming focal distance of the 1st group G1 is f1, the focal distance of the 2nd group G2 is f2, the distance between the principal point of the 1st group G1 and the 2nd group G2 in the state of infinite distance focussing is D, the change of the distance between principal points under the state of extremely close distance photograph is $\Delta D$ ($\geqq 0$) and synthetic focal distance is f12, the following relation is established As it is known from the above expression 3, at an extremely close distance, the focal distance of the front group extends and the amount of zoom out becomes large at focussing.

However the correction for close distance of the front lens group provides more freedom for correction of aberration at the extremely close distance.

With the present invention, appropriate negative refractive power is provided to the 3rd group G3 so that the refractive power of the total system becomes stronger at an extremely close distance and therefore, it is possible to reduce the zoom-out amount of lens groups G1 and G2 of the front group to a relatively low level as aforesaid in the expression 2. These are important conditions for a micro-lens.

In the case of a micro-lens the zoom-out amount of the lens generally becomes extremely large at an extremely close distance photography and therefore, various devices are incorporated in the zooming-out mechanism so that the lens barrel should not become too thick. Generally speaking, the zooming out mechanism is a multiple helicoid screw system and it tends to make the outer diameter of lens barrel greater. In order to make the lens system thinner, it is necessary, particularly for a single-lens reflex camera, to make the length of the total lens system somewhat larger when the system is set for the infinite distance and make the synthetic focal distance of the front group somewhat shorter as the focussing point is set to the nearer distance, thus reducing the substantive zooming-out amount of the lens system.

In addition, in the case of a micro-lens, the zooming-out amount of the front group is large and therefore, to secure sufficient peripheral light quantity at the state of the closest distance photography the effective diameter of the lens of the 3rd group G3 becomes inevitably large and it becomes difficult to make the lens barrel thinner. In order to prevent this condition, using the 3rd lens group G3 having the strong negative refractive power, the exit pupil can be brought closer to the image side and the zooming-out amount may be reduced but such system demands a bright lens system for the front group which comprises the 1st group G1 and the 2nd group G2 and thus the correction of aberration tends to become difficult.

With the present invention, by arranging the positive and negative lens components L7 and L8 in the 3rd group G3 in this order from the object side, the exit pupil is brought closer to the image plane thus enabling reducing the diameter of the 3rd lens group G3 which is fixed. Further, by arranging the lens components of the 3rd group G3 in this way, it is possible to reduce the magnification shared by the 3rd group G3 to a low level, which is extremely profitable from the viewpoint of correction of aberration.

From the aforesaid viewpoints, the present invention requires that the distribution of refractive power of each lens group and the positive lens L7 in the 3rd group G3 satisfy the aforesaid conditions (1) to (5) referred to hereinafter as conditional expressions.

Various conditional expressions (1)–(5) based on the aforesaid discussion are stated in detail hereunder.

Conditional expression (1) represents the ratio of the refractive power of the entire system as against the refractive power of the 1st group G1 and it determines the appropriate distribution of the refractive power of the 1st group G1. When the ratio surpasses the lower limit of expression (1), the refractive power of the 1st group G1 becomes too strong and back focus can not be sufficiently secured and it becomes necessary to reinforce the magnification $\beta 3$ of the 3rd group G3. Consequently the correction of zonal spherical aberration becomes difficult at the closest distance. It also becomes impossible to secure sufficient space between the 1st group G1 and the 2nd group G2. When the ratio exceeds the upper limit of expression (1), refractive power of the 1st group G1 becomes weaker and variation of aberrations such as spherical aberration, chromatic aberration of magnification etc. at the closest distance photography becomes excessive and correction is difficult.

Expression (2) is related to the ratio of refractive power of the 2nd group G2 as against the refractive power of the 1st group G1 and it determines the appropriate distribution of the refractive power of the 1st group G1 and the second group G2. When the ratio surpasses the lower limit of expression (2), the refractive power of the 1st group G1 becomes too strong and it becomes impossible to secure sufficient diaphragm space in the distance between the 1st group G1 and the second group G2. Thus the correction of zonal spherical aberration at the closest distance photography becomes difficult and the sagittal image surface in the photographing range at medium magnification of $\frac{1}{4}$ times goes too far in the negative direction, and that is undesirable. When the ratio exceeds the upper limit of expression (2), the refractive power of the 1st group G1 becomes too weak and the refractive power of the 2nd group G2 becomes too strong and as the result the variation of the spherical aberration at infinite distance and closest distance and the variation of radial coma aberration become excessive. To correct such excessive variation, it is necessary to increase the number of lenses in the 2nd group G2 or 3rd group G3 and that is undesirable.

Conditional expression (3) defines the appropriate share of refractive power of the 3rd group G3 as against the synthetic refractive power of the entire system. When the upper limit of expression (3) is surpassed, the refractive power of the 3rd group G3 becomes too strong and in addition, the magnification effected by the 3rd group G3 becomes too large and thus the apparent F number of the 1st group G1 and the 2nd group G2 becomes too small. Besides, the residual spherical aberration and coma aberration of these lens groups tend to become too large and it is difficult to correct various aberrations, particularly the high degree of chromatic aberration and spherical aberration having occurred to the 1st group G1 and the 2nd group G2 by the 3rd group G3. In addition, an excessive positive distortion aberration is generated at the 3rd group and to correct such aberration, a large number of lenses is required and that is undesirable.

When the lower limit of conditional expression (3) is surpassed, the refractive power of the 3rd group G3 becomes too weak and the magnification by the 3rd group G3 becomes lower and the effect of reducing the zooming-out amount at the 1st group G1 and 2nd group G2 diminishes, which is undesirable. In focussing, since the 3rd group G3 is fixed, the effective diameter of the lens group L7 and L8 among the 3rd lens group G3 becomes larger in order to secure sufficient peripheral light quantity at the closest distance photography which is undesirable. Besides, when the refractive power of the 3rd group G3 becomes too weak, back focus is unnecessarily shortened which is undesirable.

Conditional expression (4) determines the ratio of synthetic refractive power of the 1st group G1 and the 2nd group G2 as against the refractive power of the entire system and in substance, it determines the magnification to be shared by the 3rd group G3 and it supplements the aforesaid conditional expression (3). When the lower limit of the conditional expression (4) is surpassed, the amount of shift of the 1st group G1 and the 2nd group G2 for focussing becomes large, just like the case where focussing is effected by the shift of the entire lens system (total zooming-out). Besides, the negative refractive power of the 3rd group G3 becomes extremely weak and therefore no effective result of correction of aberration can be expected. When the upper limit of conditional expression (4) is exceeded, the magnification to be shared by the 3rd group G3 becomes too large and synthetic refractive power of the 1st group G1 and the 2nd group G2 which correspond to the front group becomes too strong and thus it becomes difficult to satisfactorily correct the variation of aberration at the near distance focussing.

Conditional expression (5) defines the appropriate shape of the positive lens L7 arranged at the object side which is among the 3rd lens group G3. When the upper limit of expression (5) is exceeded, it becomes difficult to secure sufficient space between the 2nd group G2 and the 3rd group G3 and at the same time spherical aberration becomes excessive to the negative side and astigmatism also becomes too large to the negative side. When the lower limit of expression (5) is surpassed, the trend of short back focus becomes substantial, spherical aberration becomes excessive to the positive side, astigmatism becomes too large to the positive side and it becomes difficult to satisfactorily correct the variation of aberration in the close distance photography.

In the composition of the present invention as aforesaid, when the focal distance of positive lens L7 and negative lens L8 in the 3rd group G3 are respectively represented by Fp and Fn, it is desirable that the following conditions are also satisfied:

$$0.18 < |Fp/f3| < 0.45 \quad (6)$$

$$0.15 < Fn/f3 < 0.3 \quad (7)$$

Conditional expressions (6) and (7) define the appropriate sharing of refractive power by positive lens L7 and negative lens L8 as against the refractive power of the 3rd group G3.

When the lower limits of the conditions (6) and (7) are exceeded, the positive refractive power of the 1st component L7 becomes strong, and consequently negative refractive power of the 2nd component L8 becomes too strong, extra-axial aberration generates, which is difficult to correct, the principal point of the 3rd group G3 shifts substantially to the image side, the exit pupil shifts substantially toward the image side and consequently correction of extra-axial aberration becomes difficult though the outer diameter of the lenses of the 3rd group may be made smaller. When the upper limits of the conditions (6) and (7) are exceeded, refractive power of the 1st component L7 and the 2nd component L8 become weak and the effect of correction of chromatic aberration of magnification and the effect of shifting the position of the exit pupil to the image side become insufficient, which is undesirable.

For the lens composition of the 1st group G1, it is desirable to arrange, from the object side, a positive lens as the 1st lens L1, a positive meniscus lens with convex surface facing the object as the 2nd lens L2 and a negative lens with convex surface facing the object side as the 3rd lens L3, while for the lenses of the 2nd group G2, it is desirable to arrange a negative lens with concave surface facing the object as the 4th lens L4, a positive lens joined with the 4th lens L4 as the 5th lens L5 and a positive lens with convex surface at both sides as the 6th lens L6. It is desirable further, to have such arrangement that the joined plane of the 4th lens L4 and 5th lens L5 in the 2nd group G2 have the convex surface facing the object side i.e., the radius r9 of the curvature of such joined plane satisfies r9>0. Thereby it becomes possible to properly control the variation of chromatic aberration on the axis of the 2nd group G2.

The embodiments shown in FIG. 1 to FIG. 3 are so designed that, as aforesaid, by shifting the diaphragm space between the positive 1st lens group G1 and positive 2nd lens group G2 to the object side while expanding such space, the distance to the following negative 3rd lens group is expanded. The diaphragm is set in between the 1st group G1 and the 2nd group G2 and it moves together with the 2nd group G2.

The space between the 2nd lens group G2 and the 3rd lens group G3 is required to be expanded for photography at the closer distance but when the 3rd group is fixed, as in the aforesaid embodiment, only the 1st group and the 2nd group move for focussing and thus the zooming-out volume of the lens group for focussing is reduced. Thus an effective composition of an auto-focussing lens system is obtained.

Tables 1–4 given hereunder indicate the factors of the 1st–4th embodiments of the present invention.

In each table, the figures at the left end indicate the order of positions of lens surfaces from the object side and r stands for the radius of curvature of the lens surface, d stands for the space between lens surfaces, Abbe stands for Abbe number and n stands for refractive index. Do stands for the distance from the surface of the object to the summit of the 1st plane of the lens and β stands for the photographing magnification. In all the embodiments, focal distance f=60.0, value of open diaphragm F=2.8 and angle of view 2W=39.4°.

What is claimed is:

1. A lens system enabling close distance photography which comprises a 1st lens group having positive refractive power, a 2nd lens group having positive refractive power and a 3rd lens group having negative refractive power, arranged in this order from the object side, wherein the 3rd lens group comprises a positive lens and a negative lens fixed relative to the image plane and the 1st lens group and the 2nd lens group are so constructed that, in focussing from infinite distance to the closest distance, they move toward the object and away from the 3rd lens group while expanding the space between them, and wherein, when the synthetic focal distance of the entire optical system at infinite distance focussing is f, the focal distance of the 1st lens group is $f_1$, the focal distance of the 2nd lens group is $f_2$, the focal distance of the 3rd lens group is $f_3$, the synthetic focal distance of the 1st lens group and the 2nd lens group is $f_{12}$ and the shape factor of the positive lens in the 3rd lens group is q, the following conditions are satisfied:

wherein the shape factor 9 is so defined that, $$q=(rb+ra)/(rb-ra)$$

where ra stands for the radius of curvature of the object side surface of the lens and rb stands for the radius of curvature of the image side surface of the lens.

2. A lens system enabling close distance photography according to claim 1, wherein, when the focal distance of the said positive lens in the 3rd lens group is Fp and the focal distance of the negative lens is Fn, the 3rd lens group satisfied the following conditions:

$$0.18<|Fp/F_3|<0.45, 0.15<|Fn/f_3|<0.3.$$

3. A lens system enabling close distance photography according to claim 1, wherein the positive lens of the 3rd lens group has convex surfaces at both sides, with a surface of stronger curvature being at the image side, and the negative lens has concave surfaces at both sides, with a surface of stronger curvature being at the object side, the two lenses being arranged in this order from the object side.

4. A lens system enabling close distance photography according to claim 1, wherein the positive lens of the 3rd lens group has a meniscus shape with a convex surface of stronger curvature facing the image side and the negative lens has a meniscus shape with a concave surface of stronger curvature facing the object side.

5. A lens system enabling close distance photography according to claim 1, which is constructed pursuant to the following data: f=60.0 open diaphragm aperture value F=2.8 angle of view 2W=39.4° wherein the numbers in the left column of the table designate the order of positions of lens surfaces from the object side, r stands for the radius of curvature of a lens surface, d stands for a space between lens surfaces, Abbe stands for the Abbe number, n stands for the refractive index, DO stands for the distance from the surface of the object to the summit of the first plane of the lens system, $\beta$ stands for the photographing magnification, fp stands for the focal distance of the positive lens of the 3rd lens group, and fn stands for the focal distance of the negative lens of the 3rd lens group.

6. A lens system enabling close distance photography according to claim 1, which is constructed pursuant to the following data: f=60.0 open diaphragm aperture value F=2.8 angle of view 2W=39.4° wherein the numbers in the left column of the table designate the order of positions of lens surfaces from the object side, r stands for the radius of curvature of a lens surface, d stands for a space between lens surfaces, Abbe stands for the Abbe number, n stands for the refractive index, DO stands for the distance from the surface of the object to the summit of the first plane of the lens system, $\beta$ stands for the photographing magnification, fp stands for the focal distance of the positive lens of the 3rd lens group, and fn stands for the focal distance of the negative lens of the 3rd lens group.

7. A lens system enabling close distance photography according to claim 1, which is constructed pursuant to the following data: f=60.0 open diaphragm aperture value F=2.8 angle of view 2W=39.4° wherein the numbers in the left column of the table designate the order of positions of lens surfaces from the object side, r stands for the radius of curvature of a lens surface, d stands for a space between lens surfaces, Abbe stands for the Abbe number, n stands for the refractive index, DO stands for the distance from the surface of the object to the summit of the first plane of the lens system, $\beta$ stands for the photographing magnification, fp stands for the focal distance of the positive lens of the 3rd lens group, and fn stands for the focal distance of the negative lens of the 3rd lens group.

8. A lens system enabling close distance photography according to claim 1, which is constructed pursuant to the following data: f=60.0 open diaphragm aperture value F=2.8 angle of view 2W=39.4° wherein the numbers in the left column of the table designate the order of positions of lens surfaces from the object side, r stands for the radius of curvature of a lens surface, d stands for a space between lens surfaces, Abbe stands for the Abbe number, n stands for the refractive index, DO stands for the distance from the surface of the object to the summit of the first plane of the lens system, $\beta$ stands for the photographing magnification, fp stands for the focal distance of the positive lens of the 3rd lens group, and fn stands for the focal distance of the negative lens of the 3rd lens group.

* * * * *